Patented Sept. 19, 1939

2,173,629

UNITED STATES PATENT OFFICE 2,173,629

PROCESS FOR THE EXTRACTION, CONCENTRATION, AND FRACTIONAL SEPARATION OF VITAMINS A AND D

Nicholas A. Milas, Belmont, Mass., assignor to Research Corporation, a corporation of New York Application August 9, 1937, Serial No. 158,262

8 Claims. (Cl. 167—81)

The general object of the present invention is the production of highly concentrated to substantially pure vitamins A and D from natural sources such as the liver oils of cod, halibut, tuna, albacore, and the like.

More specifically an object of the invention is a process by which vitamins A and D may be separated from the non-vitamin materials with which they are associated in natural sources and from each other, and recovered in substantially pure form with very little or no loss of the total original vitamin content of the source.

The process to be described hereinafter is designed for and applicable to the treatment of any of the vitamin-containing natural oils and fats.

The first step in the complete process consists in the saponification of the oil. This may be and preferably is done in the well known way by treatment with alcoholic caustic alkali. For example, raw albacore oil is heated for about one hour at about 60° C. with 3 to 4 volumes of 10% alcoholic KOH while passing a stream of purified nitrogen through the mixture to protect the vitamins against oxidation. The mixture thus formed is diluted with from about 10 to about 20 times its volume of water and is ready for treatment by the second step of the complete process. The soap solution might simply be shaken with and separated from the extracting solvent, but I prefer a counter-current extraction of the aqueous soap solution with one of various solvents such as low boiling hydrocarbons, pentanes, hexanes, heptanes or mixtures of these, petroleum ether boiling up to 60°, ethyl ether or diisopropyl ether or other low-boiling ethers, nitriles, etc. The solvent should be free from peroxides and unsaturated hydrocarbons. This extraction is carried out in an apparatus as illustrated in Fig. 1 of the accompanying drawings, the operation of which will be described more in detail hereinafter.

The saponifiable portion of the oil having been eliminated by the saponification and extraction steps, a solution of the unsaponifiable portion of the oil containing the vitamins is obtained in the solvent selected for the extraction. In the third step of the complete process this solution is evaporated in an atmosphere of nitrogen and under low pressure, e. g., about 15 mm. of mercury and with warming, if desired, up to about 60° C. to remove the solvent and the residue is taken up in methyl alcohol containing not more than 20% of water, preferably 90% methyl alcohol. The alcoholic solution is extracted several times, each time with about twice its volume of a suitable immiscible solvent such as low-boiling hydrocarbons, e. g., low-boiling petroleum ether free from peroxides and unsaturated constituents. This extraction may either be accomplished by the above described counter-current method, or by simply shaking the solution and solvent together and separating by gravity in the well known way. In the latter method about six extractions have been found to be sufficient. Thus, the vitamins and sterols are almost entirely separated from phosphatides which remain in the alcoholic solution. The petroleum ether extract is evaporated under reduced pressure in a nitrogen atmosphere and the residue taken up again in a suitable solvent, e. g., in about two parts of pure methyl alcohol yielding a solution which is ready for the fourth step of the complete process. At this point the vitamin potency of the residue which was dissolved in the pure methyl alcohol is about twenty two times that of the original oil for the vitamin A and about thirty times that of the oil for vitamin D. In other words, 1750 parts of oil give about 66 parts of concentrate having a vitamin potency of 1,580,000 units of vitamin A and 1,500,000 units of vitamin D per gram.

The vitamins are protected throughout their treatment against destruction by oxidation by operating in an atmosphere of nitrogen and for this purpose I prefer to use purified nitrogen such as may be prepared by washing commercial nitrogen with a solution of pyrogallol in 50% potassium hydroxide to remove all traces of oxygen.

The concentrate, comprising vitamins A and D and sterols and other non-vitamin materials, including hydrocarbons related to vitamin A, but free of saponifiable material and phosphatides, referred to above is next subjected to a systematic fractionation which comprises the fourth step, to separate the vitamin A as one product, vitamin D as a second product, and the impurities including the sterols as a third product. This fractionation consists essentially in fractionally crystallizing the solution of the concentrate which has been freed from saponifiable material and phosphatides at various temperatures, from +20° to about −78° C. In each successive stage of this process, as the temperature is gradually lowered in intervals of about 5 degrees, the purity of vitamin A in the filtrate increases and approaches 100% in the final filtration, while the inert material together with vitamin D passes into the residues. In the first series of fractionations there are about 21 stages each yielding a residue which contains not only the inert material and vitamin D, but also small amounts of occluded vitamin A which increases as the temperature decreases. The first residue of the first series is therefore redissolved in a definite quantity of warm solvent, e. g., methyl alcohol, and the temperature brought slowly down to $+20°$ with agitation produced by a stream of pure nitrogen or some other inert gas. The cooled solution is filtred into the second residue of the first series, while its residue which is free from any active material is discarded. The fractionation is continued and the filtrate from each successive step is combined with the appropriate residue of the first series. The residues from this series of fractionations, with the exception of the first one which is discarded, are fractionated again to eliminate the inert material in the first few stages and vitamin A in the final stage, thus effecting a separation of vitamin D from vitamin A and from sterols and other inactive materials.

The individual fractionating stages will be described more in detail in connection with Fig. 2 of the drawings and the fractionation scheme in connection with Fig. 3 of the drawings.

Referring to the drawings, Fig. 1 is a schematic view of apparatus suitable for extracting the vitamin A and D contents of the saponified oil.

Figure 1:
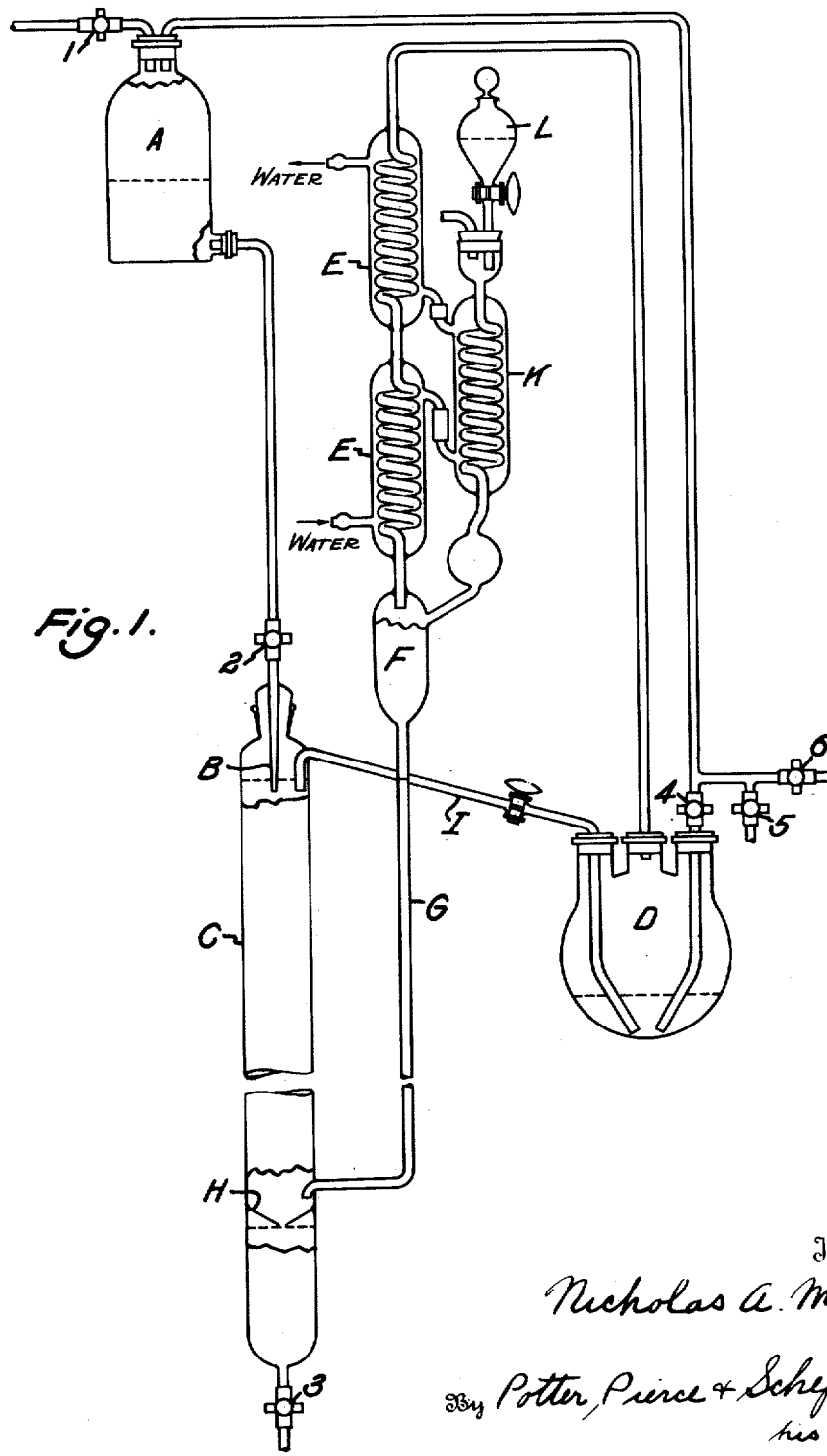

The construction and operation of the apparatus of Fig. 1 will be understood from the following description of the process carried out in it.

The soapy solution formed in the first step of the process is sucked into the reservoir A (about 20 liters capacity) from a source of supply (not shown) by opening stop cocks 1 and 5 and closing stop cocks 2, 4 and 6, and applying suction at 5. When reservoir A is full, stop cocks 1 and 5 are closed and 6 is opened to admit nitrogen into the upper portions of the apparatus. Stop cocks 2 and 4 are then opened and the soapy solution is delivered by the nozzle B in a fine spray through the column of solvent in column C. In the apparatus illustrated the column of solvent is about 5 feet high and about 3 inches in diameter. By opening cock 3, the extracted aqueous liquid may be withdrawn from the bottom of column C at the same rate as the soap solution enters. At the same time by heating flask D the solvent in it is vaporized and the vapors are condensed in the coils E and collect in the bulb F from which they flow by way of the tube G into the column C near the lower end thereof adjacent the separating diaphragm H. As fresh solvent is thus supplied to column C and moves upward therein, solvent which has reached the highest concentration in vitamin content overflows through tube I into the flask D. Thus the extraction process is continuous, the vitamin containing extract or concentrate accumulating in the flask D. The coil K serves to permit nitrogen admitted through cock 6 to be exhausted from the system without loss of solvent. In order to prevent frothing at the interface between the aqueous and non-aqueous layers in column C, a suitable agent such as ethyl alcohol is supplied from the dropping funnel L and flows down through coil K, bulb F, and pipe G to the interface.

It has been found that a single pass of the soapy solution through the column of solvent serves to recover practically all of the non-saponifiable matter including the vitamins, but it is apparent that it may be passed repeatedly, if necessary, in order to improve the vitamin recovery.

The concentrate in the flask D is withdrawn and the solvent removed under reduced pressure in an atmosphere of nitrogen and the residue taken up in methyl alcohol of at least 80% concentration as described above. The foregoing is a detailed description of the second step of the process. The third step for the separation of phosphatides has already been described.

Figure 2:
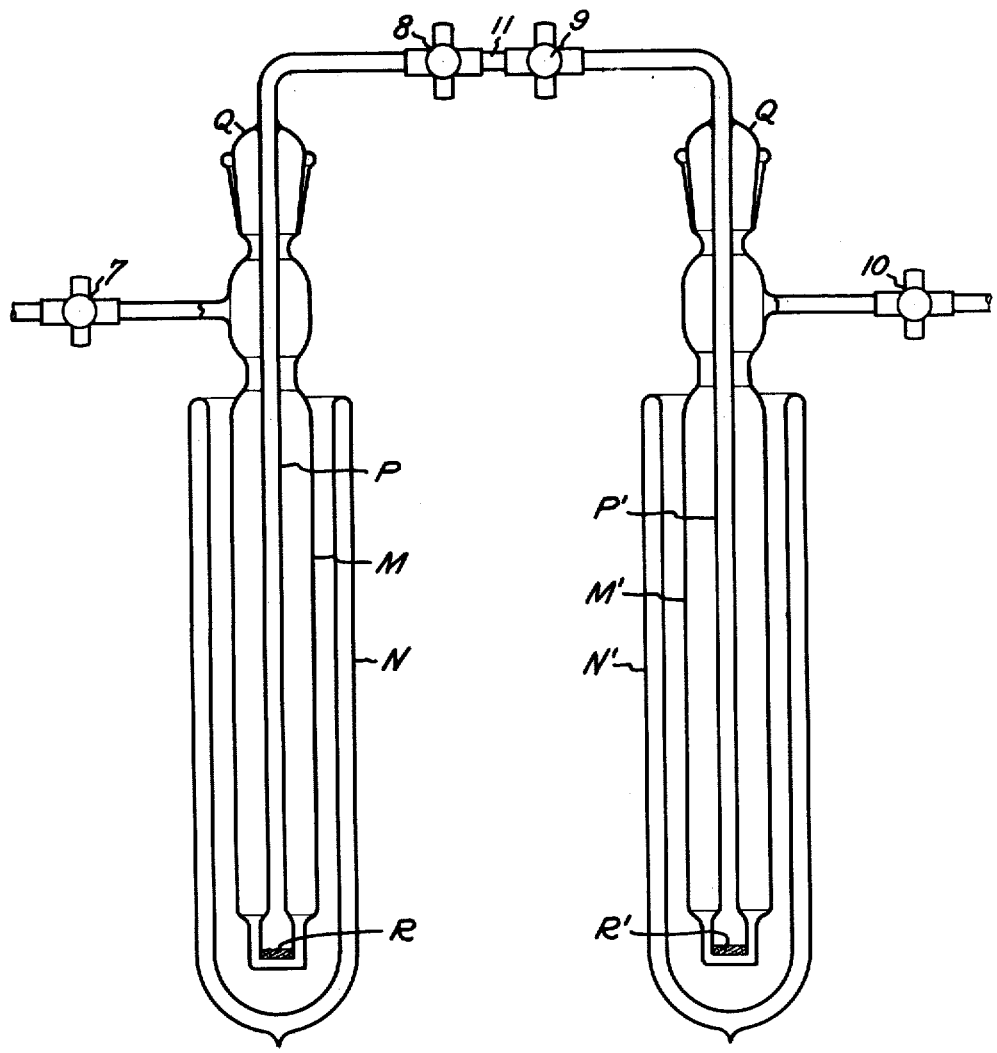
Fig. 2 shows a single unit of the fractionating apparatus.

The fourth step, i. e., the fractionation, is carried out in an apparatus two units of which are shown in Fig. 2. In the fractional separation of the vitamins from each other and from the sterols and hydrocarbons related to vitamin A, it is essential that the crystallization of the sterols be caused to proceed slowly with gentle agitation. If crystallization is allowed to proceed rapidly, the sterols separate in a finely divided state and carry both vitamins A and D along with them. In the operation of the apparatus disclosed in Fig. 2 the solution is gently agitated by the passage of a slow stream of nitrogen gas while the solution is being slowly cooled and crystallization is taking place. The solution is placed in the tube M surrounded by the Dewar flask or other suitable heat insulating receptacle N. The space between tube M and receptacle N is filled with cooling agent. P is a glass tube extending down through the stopper Q to near the bottom of tube M and its lower end is closed by the filter element R which may be formed of filter paper, sintered glass, alundum, or the like. In the early stages of the filtration when relatively large amounts of sterols are being separated it is desirable to use filter paper to avoid clogging which is more likely to occur with the sintered glass filter.

The solution in tube M is cooled through the desired range, say 5 to 10° C., while being gently agitated by a flow of nitrogen entering at cock 10 and flowing through tube M', filter R', tube P', cocks 9 and 8, tube P and filter R and passing up through the solution and out by way of the cock 7. When the cooling and crystallization of sterols are complete the solution is forced through filter R, over into tube M' by the introduction of nitrogen through cock 7 and applying suction at cock 10, tube M' being kept at the same temperature as tube M. Cocks 7, 8, 9 and 10 are then closed, the connection 11 between cocks 8 and 9 is separated and tube M' is connected to another similar tube and the cooling and filtering operation on the solution repeated at a lower temperature. Repetition of this cooling and filtering results in a progressively more nearly pure vitamin A solution. The sterols separate first at higher temperatures and at lower temperatures such as $-30$ to $-40°$ C. the hydrocarbons related to vitamin A begin to separate.

Figure 3:
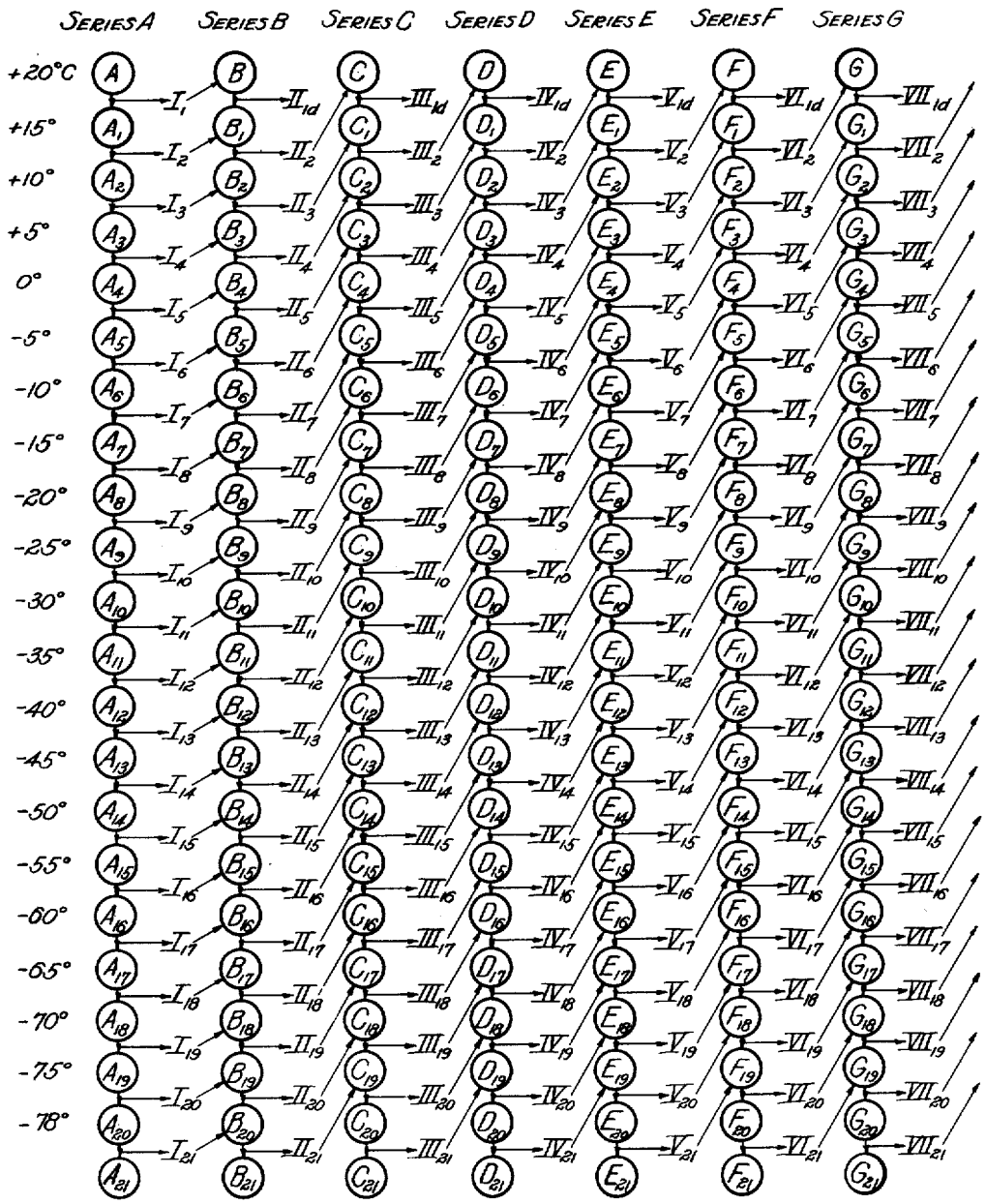
Fig. 3 is a flow diagram showing the systematic fractionation.

An ideal fractionation procedure is illustrated in Fig. 3. According to this chart a solution A, which is the first member of Series A, containing vitamins A and D and sterols, is cooled and filtered giving a filtrate $A_1$ which in turn is cooled and filtered at a lower temperature and so on, giving solutions $A_2$, $A_3$, etc., and residues $I_1$, $I_2$, $I_3$, etc., down to a final temperature of $-78°$ C. The temperature drop at each stage is shown in the left hand column of figures.

The residue I₁ from the first fractionation is redissolved in fresh solvent giving solution B which is the first member of Series B. This is cooled and fractionated in the same manner giving residue II₁d and a filtrate which is combined with residue I₂ forming solution B₁ which in turn is fractionated giving a filtrate and residue II₂. The residue II₁d is discarded as being substantially free from any vitamins. The residue II₂, on the other hand, is redissolved in fresh solvent forming solution C which is the first member of Series C. Similarly, this solution is cooled and fractionated as before, giving residue III₁d which is discarded, and a filtrate which is combined with residue II₃ to produce C₁. The whole procedure can be easily followed from the chart of Fig. 3, bearing in mind that the first residue produced in each series, except that of series A, is discarded as being substantially free from vitamins. The purity of vitamin A increases toward the bottom of each series, the sterols and other inert materials are discarded at the top of each series, except the one on Series A, and the purity of vitamin D increases as fractionations proceed from left to right on the chart.

The procedure in accordance with the chart may be varied considerably, for instance two or more residues may be combined and two or more filtrates may be combined. There may be as many of the series A, B, C, etc., as desired, and as many filtrations as desired in each series and the temperature gradient may be chosen as desired and may be varied within a given series. Also the temperature drop may be different in the different series.

It has been found that as the fractionation proceeds in each series from room temperature downward to —78° C., the concentration of vitamin A in the filtrates increases and vitamin D is left behind in the residues and is pushed over to the right into the succeeding series. Furthermore, it was found that the filtrates at the bottoms of the series are rich in vitamin A, those at the extreme left being nearly pure vitamin A, while as the fractionation proceeds from left to right, that is, from series A to series Z in the alphabet, the filtration residues at the bottom increase in vitamin D potency until in the J series the vitamin D has come down almost pure with a potency of over 25,000,000 U. S. P. units per gram.

The following concrete examples are illustrative:

*Example 1.*—A sample of tuna liver oil, 1312 g., having a potency of about 38,000 U. S. P. units of vitamin A per gram and about 63,000 U. S. P. units of vitamin D per gram, was saponified with alcoholic potash at about 65° C. for one half hour, and the mixture diluted with water to over ten times its original volume. The soapy solution was then extracted by the countercurrent method described in the foregoing pages and the extract evaporated under reduced pressure. The residue was dissolved in about 90% methyl alcohol and the solution extracted several times with low boiling petroleum ether in order to free it from phosphatides. The petroleum ether concentrate was evaporated under reduced pressure and the residue dissolved in pure methyl alcohol. After the bulk of the sterols was removed at room temperature, fractionation was continued in accordance with the chart of Figure 3. Twenty one fractionations in the A series produced a sample A₂₁ which had a potency of over 2,000 U. S. P. units of vitamin A and less than 10 U. S. P. units of vitamin D per mg. Table I below shows potencies of samples assayed in the course of fractionation from which it may be seen that as the potency of vitamin A increases that of vitamin D decreases and vice versa.

TABLE I

*Course of the fractionation*

| Sample | Potency in U. S. P. units/mg. | |
|---|---|---|
| | Vitamin A | Vitamin D |
| B₁₀ | 1,180 | 20,000 |
| B₁₄ | 1,190 | 1° |
| B₁₈ | 1,600 | |
| B₂₁ | 2,100 | |
| C₆ | 1,100 | 20,000 |
| D₁₀ | 500 | 22,000 |
| G₁₀ | 32 | 8,600 |
| G₁₄ | 32 | 13,000 |
| G₁₈ | 32 | 22,000 |
| G₂₁ | 32 | 23,000 |
| J₁₄ | 32 | 25,000 |

*Example 2.*—One gallon of albacore (Germo Germo) liver oil having a potency of 68,000 U. S. P. vitamin A units and over 50,000 U. S. P. vitamin D units per gram was treated in the same manner as in Example 1, and the unsaponifiable matter free from phosphatides was recovered. After the bulk of sterols was removed at room temperature, the sample was assayed and found to have a potency of 1,580,000 U. S. P. vitamin A units and 1,500,000 U. S. P. vitamin D units per gram. This sample was then fractionated following the chart shown in Figure 3. Sample A₂₁ in the A series showed a potency of 3,200,000 U. S. P. vitamin A units and less than 12,000 U. S. P. vitamin D units per gram. A continuation of the fractionation in the other series brought the potency of vitamin D to over 20,000,000 U. S. P. units per gram.

From the foregoing examples one may see that the process effects a successful extraction, concentration and fractionation of vitamins A and D from oils containing these vitamins. It may be emphasized further that the present process is not limited to oils of high vitamin A and D potency but is equally applicable to oils, such as cod liver, which have low vitamin A and D potency.

It is understood that the vitamins are to be protected throughout their treatment or wherever such protection is worth while by avoiding destructive heating and contact with oxidizing influences. Distillations are carried out at low temperatures, generally below 65° C., and in a non-oxidizing atmosphere, such as nitrogen and the solvents used are to be free of harmful impurities such as peroxides and unsaturated hydrocarbons.

I claim:

1. A process for the extraction, concentration and fractional separation of the vitamin A and D contents of naturally occurring substances which comprises saponifying the saponifiable constituents thereof, separating the unsaponifiable portion by extraction using a selective solvent, separating the phosphatide content of said unsaponifiable portion by selective solvent action, subjecting the remainder of said unsaponifiable portion comprising vitamins A and D together with sterols and other inert materials to a systematic fractionation which comprises progressively cooling and fractionally crystallizing and filtering at successively lower temperatures a solution thereof thereby separating a solution of vitamin A in substantially pure form from a series of residues containing vitamin D, vitamin A, sterols, and other inert materials, redissolving and recrystallizing and filtering the residues in sequence including discarding the residue from the highest temperature crystallization, thereby separating a second series of residues from a solution of substantially pure vitamin A, repeating the redissolving, recrystallizing and filtering sequence upon the residues in a plurality of series whereby to dissolve from the residues substantially all the vitamin A and to purify the same by low temperature crystallization, to separate from the residues substantially all the sterols and other inert materials by discarding the residue from the highest temperature crystallization in each series, leaving the final residues as substantially pure vitamin D.

2. A process for the isolation, concentration and fractional separation of the vitamin A and D contents of naturally occurring substances which comprises separating the vitamins A and D together with sterols and phosphatides from the bulk of the inert materials including glycerides, subjecting the resulting concentrate to a selective solvent separation to remove phosphatides, and subjecting the remainder to a systematic fractionation which comprises progressively cooling and fractionally crystallizing and filtering at successively lower temperatures a solution thereof thereby separating a solution of vitamin A in substantially pure form from a series of residues containing vitamin D, vitamin A, sterols, and other inert materials, redissolving and recrystallizing and filtering the residues in sequence at temperatures which are at least as high as the temperature of crystallization of the respective residues, including discarding the residue from the highest temperature crystallization, thereby separating a second series of residues from a solution of substantially pure vitamin A, repeating the redissolving, recrystallizing and filtering sequence upon the residues in a plurality of series whereby to dissolve from the residues substantially all the vitamin A and to purify the same by low temperature crystallization, to separate from the residues substantially all the sterols and their inert materials by discarding the residue from the highest temperature crystallization in each series, leaving the final residues as substantially pure vitamin D.

3. A process for the isolation and separation of vitamin A from naturally occurring substances containing vitamin A, vitamin D, and sterols, which comprises separating the vitamins A and D and sterols from the bulk of inert material comprising glycerides and phosphatides, and subjecting the separated mixture comprising vitamins A and D and sterols to a separation involving dissolving the mixture in a solvent therefor and progressively cooling the solution through a plurality of small decrements of temperature and filtering the solution after each cooling step to concentrate the vitamin A in substantially pure form in the filtrate and to leave the vitamin D and sterols in the filtration residues.

4. A process for the isolation and fractional separation of vitamins A and D from naturally occurring substances which comprises separating the vitamins A and D together with sterols from the bulk of inert materials comprising glycerides and phosphatides occurring in said substances and subjecting the separated mixture comprising vitamins A and D, sterols and other inert materials to a systematic fractionation involving dissolving the mixture in a selective solvent and repeatedly cooling and filtering the solution at successively lower temperatures whereby producing a solution of substantially pure vitamin A and a series of residues, and redissolving and recrystallizing the residues each at a temperature at least as high as the temperature at which it was produced thereby forming a second solution of substantially pure vitamin A and a second series of residues, continuing the sequence of steps through a plurality of series of fractional crystallizations including removing and discarding the sterols and other inert materials at the highest temperatures, whereby to isolate and separate in substantially pure form the vitamin A in the filtrates and the vitamin D in the filtration residues.

5. Process for the isolation and fractional separation of the vitamin A and D contents of vitamin containing fish liver oils which comprises saponifying the oil, diluting the saponified mixture with water, passing downwards the resulting solution in finely divided form through a column of a non-aqueous solvent which is moving upwards and is immiscible with water to extract the unsaponifiable portion including the vitamins, separating phosphatides from the extracted material, and subjecting the residue to a fractional solvent separation which comprises progressively cooling and fractionally crystallizing and filtering at successively lower temperatures a solution thereof thereby separating a solution of vitamin A in substantially pure form from a series of residues containing vitamin D, vitamin A, sterols, and other inert materials, redissolving and recrystallizing and filtering the residues in sequence at temperatures which are at least as high as the temperature of crystallization of the respective residues, including discarding the residue from the highest temperature crystallization, thereby separating a second series of residues from a solution of substantially pure vitamin A, repeating the redissolving, recrystallizing and filtering sequence upon the residues in a plurality of series whereby to dissolve from the residues substantially all the vitamin A and to purify the same by low temperature crystallization, to separate from the residues substantially all the sterols and other inert materials by discarding the residue from the highest temperature crystallization in each series, leaving the final residues as substantially pure vitamin D.

6. Process as defined in claim 5 in which the oil is saponified with alcoholic caustic alkali and in which the unsaponifiable portion is freed of phosphatides by evaporating the non-aqueous solvent, taking the residue up in methyl alcohol and extracting the resulting methyl alcohol solution with a low boiling saturated hydrocarbon solvent.

7. Process of separating the vitamin A and D contents of a concentrate thereof containing sterols but free of phosphatides derived from a vitamin containing fish liver oil which comprises extracting said residue with methyl alcohol, and subjecting the resulting solution to a systematic fractionation involving cooling and filtering the solution a plurality of times at successively lower temperatures thereby producing a final filtrate having a relatively high concentration of vitamin A and a relatively low concentration of vitamin D and sterols and a series of residues having progressively increasing vitamin A and progressively decreasing vitamin D and sterol contents, redissolving each residue and cooling and filtering the resulting solutions and discarding the first residue of each series after the first thereby producing a second final filtrate of relatively high vitamin A and relatively low vitamin D and sterol content and a second series of residues, and repeating this procedure a plurality of times whereby to concentrate the vitamin A in the filtrates the vitamin D in the retained residues and the sterols in the discarded residues.

8. Process for the isolation and fractional separation of vitamins A and D and sterols which comprises dissolving the mixture in methyl alcohol at a temperature above +20° C., cooling the solution down to about +20° C. under gentle agitation with a pure inert gas, filtering the cooled solution to separate clear solution from residue and continuing the cooling and filtration of the solution at temperature intervals of about 5° C. down to about −78° C. to produce a final filtrate of substantially pure vitamin A and a first series of filtration residues, dissolving the first filtration residue of said first series in fresh solvent at a temperature above +20° C., cooling the solution down to about +20° C. under agitation with inert gas, filtering the cooled solution, discarding the filtration residue, combining the filtrate with the second filtration residue of the first series and cooling and filtering the mixture, and continuing this sequence of steps whereby each of the filtrates of the second series is combined with the filtration residue next higher in order of the first series down to a final filtrate in the second series at about −78° C., dissolving the second filtration residue of the second series in fresh solvent, cooling and filtering and combining each succeeding filtrate of this series with the filtration residue second higher in order of the second series thereby producing a final filtrate and a third series of filtration residues, continuing the above described procedure including discarding the first filtration residue of each series after the first, through the desired number of series whereby sterols and other inert materials are discarded as filtration residues at the beginning of each series, solutions of substantially pure vitamin A are produced at the end of each series and filtration residues containing vitamin D are produced in the last series.

NICHOLAS A. MILAS.

CERTIFICATE OF CORRECTION.

Patent No. 2,173,629.            September 19, 1939.

NICHOLAS A. MILAS.

It is hereby certified that error appears in the printed specification of the above numbered patent requiring correction as follows: Page 4, second column, line 5, claim 4, for the word "whereby" read thereby; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.

sterol contents, redissolving each residue and cooling and filtering the resulting solutions and discarding the first residue of each series after the first thereby producing a second final filtrate of relatively high vitamin A and relatively low vitamin D and sterol content and a second series of residues, and repeating this procedure a plurality of times whereby to concentrate the vitamin A in the filtrates the vitamin D in the retained residues and the sterols in the discarded residues.

8. Process for the isolation and fractional separation of vitamins A and D and sterols which comprises dissolving the mixture in methyl alcohol at a temperature above +20° C., cooling the solution down to about +20° C. under gentle agitation with a pure inert gas, filtering the cooled solution to separate clear solution from residue and continuing the cooling and filtration of the solution at temperature intervals of about 5° C. down to about −78° C. to produce a final filtrate of substantially pure vitamin A and a first series of filtration residues, dissolving the first filtration residue of said first series in fresh solvent at a temperature above +20° C., cooling the solution down to about +20° C. under agitation with inert gas, filtering the cooled solution, discarding the filtration residue, combining the filtrate with the second filtration residue of the first series and cooling and filtering the mixture, and continuing this sequence of steps whereby each of the filtrates of the second series is combined with the filtration residue next higher in order of the first series down to a final filtrate in the second series at about −78° C., dissolving the second filtration residue of the second series in fresh solvent, cooling and filtering and combining each succeeding filtrate of this series with the filtration residue second higher in order of the second series thereby producing a final filtrate and a third series of filtration residues, continuing the above described procedure including discarding the first filtration residue of each series after the first, through the desired number of series whereby sterols and other inert materials are discarded as filtration residues at the beginning of each series, solutions of substantially pure vitamin A are produced at the end of each series and filtration residues containing vitamin D are produced in the last series.

NICHOLAS A. MILAS.

CERTIFICATE OF CORRECTION.

Patent No. 2,173,629. September 19, 1939.

NICHOLAS A. MILAS.

It is hereby certified that error appears in the printed specification of the above numbered patent requiring correction as follows: Page 4, second column, line 5, claim 4, for the word "whereby" read thereby; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.